United States Patent [19]

Keibler

[11] 4,304,605

[45] Dec. 8, 1981

[54] HIGH TEMPERATURE RESISTANT COATING COMPOSITION

[76] Inventor: Richard C. Keibler, R.D. #6, Apollo, Pa. 15613

[21] Appl. No.: 126,968

[22] Filed: Mar. 3, 1980

[51] Int. Cl.$^3$ .............................................. C04B 19/04
[52] U.S. Cl. ...................................... 106/84; 106/38.3
[58] Field of Search ............................. 106/57, 84, 38.3

[56] References Cited

U.S. PATENT DOCUMENTS

| | | | |
|---|---|---|---|
| 2,889,229 | 6/1959 | Steinhoff | 106/57 |
| 3,100,154 | 8/1963 | Oshima | 106/57 |
| 3,203,057 | 8/1965 | Hunt et al. | 106/38.3 |
| 3,222,197 | 12/1965 | Sibert et al. | 106/84 |
| 3,274,007 | 9/1966 | Jones | 106/57 |
| 3,380,849 | 4/1968 | Pollack | 106/57 |
| 3,389,002 | 6/1968 | Huffcut | 106/84 |
| 3,447,936 | 6/1969 | Ornitz | 106/84 |
| 3,464,839 | 9/1969 | Gamble | 106/57 |
| 4,095,985 | 6/1978 | Brown | 106/84 |

*Primary Examiner*—James Poer
*Attorney, Agent, or Firm*—James Irwin

[57] ABSTRACT

A protective coating composition suitable for refractory brick or refractory linings and materials exposed or subjected to high temperatures is provided. The composition comprises about 40 to 95 wt. % zirconium silicate, up to 30 wt. % sodium silicate, 1 to 10 wt. % mullite, up to about 5 wt. % magnesium silicate, 1 to 10 wt. % aluminum hydrate, the remainder water, the composition capable of withstanding temperatures up to 4,000° F.

12 Claims, No Drawings

HIGH TEMPERATURE RESISTANT COATING COMPOSITION

INTRODUCTION

The present invention relates to coating compositions and more particularly it relates to protective coatings for refractories and the like exposed to high temperatures and which may be exposed to hot or molten metals. The coating is especially useful for coating metal molds and refractories used in the making of steel.

In processes relating to steel making, for example, various types of refractory liners are used, selection of the refractory depending to some extent on the particular step of the process and the environment to which it is exposed. For example, the side walls of coke ovens are often constructed of or are lined with a silica brick held or bonded together with a silica mortar. Because of the nature of the coking process, the side wall refractory is subjected to intense heat which can cause it to crack and spall. This can result in harmful gases escaping into the atmosphere. Spalling is one of the major causes of refractory degradation or deterioration and is generally described as the breaking away of pieces of refractory from the hot surface. This, of course, results in a fresh surface being exposed and the further deterioration of such surface. One of the causes of spalling is the sudden change in temperature to which the refractory is exposed. It should be understood that spalling may also occur upon removal of slag accumulations from the refractory surfaces.

Other examples of particular refractory use include the lining of blast furnaces with fireclay brick where resistance to abrasion and disintegration by carbon monoxide is important In addition to the above, open-hearth furnaces use various types of refractory brick including silica, fireclay and high alumina brick (e.g. 60 to 80 wt.% $Al_2O_3$). Also, soaking pits require refractories which have good resistance to abrasion and to iron-oxide attack. However, even though great selectiveness is practiced in the various applications, the linings are still subject to deterioration and are required to be restored or replaced at high costs both from the standpoint of downtime and new refractories. Thus, it can be seen that there is a great need for a coating which can be applied to refractories used in these processes and which will extend their useful life significantly.

The present invention fulfills this need by providing a coating composition which exhibits high thermal shock and abrasion resistance and is resistant to deterioration by molten metal.

SUMMARY OF THE INVENTION

An object of the present invention is to provide a protective coating composition for refractories and materials exposed to high temperatures.

Another object of the present invention is to provide a coating composition for metal molds.

Yet another object of the present invention is to provide a protective coating composition for refractories used in steel making.

And yet a further object of the present invention is to provide a method for protecting refractories used in molten metal furnaces such as electric furnaces used in the making of steel.

These and other objects will become apparent from the specification and claims appended hereto.

In accordance with these objects there is provided a coating composition suitable for application to refractory linings including brick or cast linings. In addition, the composition may be applied to surfaces for purposes of fireproofing. The composition comprises about 40 to 95 wt.% zirconium silicate, up to 30 wt.% sodium silicate, 1 to 10 wt.% mullite, up to 5 wt.% magnesium silicate, and 1 to 10 wt.% aluminum hydrate, the remainder water. The coating composition is capable of withstanding temperatures up to 4,000° F.

DETAILED DESCRIPTION OF THE PREFERRED EMBODIMENTS

In one aspect of the present invention, a coating composition is provided which is suitable for application to refractory linings and to other surfaces exposed to high temperatures to provide increased resistance to thermal, mechanical and abrasive type degradation. The composition also has significant resistance to molten metals, e.g. molten iron or steel and comprises about 40 to 95 wt.% zirconium silicate, up to about 30 wt.% sodium silicate, about 1 to 10 wt.% mullite, up to about 5 wt.% magnesium silicate, from about 1 to 10 wt.% aluminum hydrate, the remainder water. In a preferred aspect of the invention zirconium silicate should be maintained above 55 wt.% with a typical concentration being above 70 wt.%. With respect to sodium silicate, in a preferred composition range from to about 0.1 to 15 wt.%, with a typical or suitable amount being in the range of about 0.5 to 10 wt.%. Mullite ($3Al_2O_3.2SiO_2$) should be maintained in the range of about 2 to 5 wt.%, with a typical amount about 3.0 wt.%. In the composition, magnesium silicate is preferably maintained in the range of about 0.1 to 2.5 wt.%, with a typical amount being about 0.5 wt.% and aluminum hydrate is also preferably maintained in the range of 2 to 5 wt.% with a typical amount being about 2.5 wt.%. The balance in each composition is water, particularly if the coating is to be applied by spraying. It will be appreciated that for purposes of spraying, water is provided in an amount which makes the composition quite flowable. When the intended use of the composition is cement or mortar between bricks, then the amount of water can be much less than for spraying. That is, it may not be necessary to intentionally provide water. If sodium silicate is used in the form of water glass, sufficient water can be present for cement or mortar use. The concentrations referred to are particularly useful for treating refractories such as silicabased or fireclay brick or the like as used, for example, in the lining or lid of an electric furnace in the steel making process.

Particle size of the constituents in the composition should be maintained in the range of about 94 to 325 mesh (U.S. Seive Series) with a preferred particle size being in the range of 150 to 300 mesh. It is important that the particles should be maintained in these ranges in order to obtain efficient dispersion and mixing of the components and the proper bonding or reaction on curing.

In one embodiment, it is preferred to provide the coating composition in a consistency which permits spraying it for purposes of applying a coating in accordance with the invention. That is, because of the high temperatures that can be present at the time of application, the protective coating composition is expeditiously applied using spray nozzles suitably mounted on an apparatus which can be extended into furnaces or ovens, e.g. electric furnaces and roof therefor or coke ovens. It will be understood that this type of application has the advantage of permitting the refractory to be treated while the furnace or oven is relatively hot, e.g. 2,000°-3,000° F., thereby minimizing downtime for repairs. Thus, a typical composition for spraying in this manner may comprise 500 lbs. zirconium silicate, 35 lbs. sodium silicate, 20 lbs. mullite, 2 lbs. magnesium silicate, 20 lbs. aluminum hydrate and 24 gallons of water. It should be noted that kaolinite may be used in place of or in combination with mullite.

In constructing a liner in a furnace or oven using refractory brick, it can be advantageous to dip such brick in a slurry composition of the present invention prior to the construction step. Thereafter, the brick may be bonded together using the composition of the invention. Alternatively, the brick may be bonded together using a different seam mortar.

For purposes of treating linings of refractory brick, e.g. silica, nitride, fireclay or alumina-based brick by spraying, the coating can be applied at ambient up to rather high temperatures without interfering with the integrity of the coating. For example, the coating may be applied at room temperatures. However, temperatures of 100° F. or higher are advantageous from the standpoint of removing water from the coating system. Accordingly, the coating may be applied at temperatures in the range of 200° to 300° F. or higher with the higher temperature having the advantage of effecting earlier removal of water or drying of the coating.

After the coating has been applied, it should be cured in order to provide resistance to corrosive environments, e.g. molten metal and gases such as carbon monoxide or iron oxide such as encountered in the steel making process. For purpose of curing, the coating should be heated at a temperature of at least 1,000° F. for a time sufficient to effect the cure. At a temperature of about 2,000° F., the cure can be effected in a rather short time, e.g. as short as one minute. After subjecting the coating to a temperature in the range of about 1,600°-2,000° F. the coating becomes quite resistant to abrasion, with a greater degree of resistance being obtained when the cure temperature is in the range of 2,000°-3,000° F. In certain instances, it may be possible to permit the coating in a vessel, e.g. a ladle, to dry in the air at ambient and thereafter it may be set or cured by pouring molten metal into the vessel. However, presently it has been observed that such method can result in blistering of the coating particularly if the coating has a thickness exceeding about 0.1 inches. This is thought to be the result of water in the coating being removed in a way which does not permit a sufficient time for cure. That is, the blistering is thought to be the result of thermal shock. It will be appreciated that in certain applications, e.g. soaking pit, the coating may be cured during the heating or soaking operation.

It should be noted that while in many instances it is most effective to treat the refractory, such as a castable or brick type refractory, in the unused condition, the coating can be applied periodically for purpose of preventative maintenance with excellent results. Also, the coating composition of the instant invention, as well as having application in most types of furnaces used in the steel making process, e.g. electric furnaces, blast furnace, and oxygen furnace, has excellent use in ladles, holding furnaces and the like. Other application can include fireboxes and grates therefor. Also, it may be used as a fireproof coating on materials used in the construction industry, such as block, wood, styrofoam, and urethane foam members, with excellent results.

In addition to the above, the protective coating has been found to be useful as a releasing agent in molds such as metal molds used for casting purposes. That is, the coating of the present invention protects against erosion or wear resulting from the pouring of molten metal such as iron or steel into metal molds. In pouring molten metal into metal molds, cavities can occur and in later operations these cavities result in great difficulty in stripping the metal from the mold. It is this type activity which the coating of the present invention protects against. Further, the composition can be used to fill in or repair such cavities as well as other undesirable cracks or fissures, making the separation of casting and mold relatively easy in subsequent operations. In treating metal molds, e.g. cast iron molds, with the coating, curing temperatures are substantially as referred hereinbefore.

Coating thickness applied to molds or refractories is usually on the order of about 0.01 to about 0.1 inches. However, the coating can be thicker or thinner depending to some extent on the purpose, e.g. repair.

The zirconium silicate suitable for use in the composition may be obtaine from Tam Ceramics, under the designation 51421 Pre G Zircon Flour and magnesium silicate may also be obtained from Tam Ceramics under the designation 32010 Ben-a-gel EW. Mullite may be obtained from C. E. Minerals, under the designation M-47, 100M Mulgrain and the aluminum hydrate may be obtained from ALCOA, under the reference C-33. Sodium silicate suitable for use in the composition can be obtained from E. I. Dupont, under the designation sodium silicate glass F Pwd.

While the invention has been described in terms of preferred embodiments, the claims appended hereto are intended to encompass other embodiments which fall within the scope of the invention.

What is claimed is:

1. A coating composition suitable for application to refractory linings and other types of surfaces exposed to high temperatures to provide the linings and surfaces with increased resistance to thermal degradation, the composition comprising zirconium silicate in the range of about 40 to 95 wt.%, sodium silicate in the range of about 0.1 to 30 wt.%, aluminum silicate in the range of about 1 to 10 wt.%, magnesium silicate up to 5 wt.%, alumina hydrate in the range of about 1 to 10 wt.%, the remainder water, the coating composition capable of withstanding temperatures up to 4,000° F.

2. The coating composition in accordance with claim 1 wherein the zirconium silicate is maintained above 55 wt.%, sodium silicate is maintained up to 15 wt.%, aluminum silicate is maintained in the range of 2 to 5 wt.%, magnesium silicate is maintained in the range of 0.1 to 2 wt.%, the remainder water.

3. The coating composition in accordance with claim 1 wherein the zirconium silicate therein has a particle size in the range of 100 to 325 mesh (U.S. Seive Series).

4. A coating composition suitable for application to refractory linings and surfaces exposed to high temperatures to provide the linings and surfaces with increased resistance to thermal degradation, the composition comprising zirconium silicate in the range of about 55 to 95 wt.%, sodium silicate in the range of 0.1 to 15 wt.%, mullite in the range of about 2 to 5 wt.%, magnesium silicate in the range of about 0.1 to 2.5 wt.%, alumina hydrate in the range of 2 to 5 wt.%, the remainder water, the sodium silicate, mullite, and alumina hydrate being present in the composition in a particle size in the range of 100 to 325, the coating composition capable of withstanding temperatures up to 4,000° F., after curing.

5. A coating composition for refractory linings and metal molds which greatly enhances the useful life of the linings and acts as a releasing agent for metal molds, by being resistant to degradation by molten metal, the composition comprising zirconium silicate in the range of about 40 to 95 wt.%, sodium silicate in the range of 0.1 to 30 wt.%, mullite in the range of about 1 to 10 wt.%, magnesium silicate up to 10 wt.%, alumina hydrate in the range of 1.0 to 10 wt.%, the remainder water.

6. The coating composition in accordance with claim 5 wherein the zirconium silicate is maintained above 55 wt.%.

7. The coating composition in accordance with claim 5 wherein the sodium silicate is in the range of 0.5 to 15 wt.%.

8. The coating composition in accordance with claim 5 wherein mullite is in the range of 1 to 5 wt.%.

9. The coating composition in accordance with claim 5 wherein the magnesium silicate is in the range of 0.1 to 2.5 wt.%.

10. The coating composition in accordance with claim 5 wherein the alumina hydrate is in the range of 1 to 5 wt.%.

11. A coating composition for refractory linings and metal molds which greatly enhances the useful life of the linings and acts as a releasing agent for metal molds by being resistant to degradation by molten metal, the composition comprising greater than 55 wt.% zirconium silicate, 0.5 to 10 wt.% sodium silicate, 2 to 5 wt.% mullite, 0.1 to 2.5 wt.% magnesium silicate, 1 to 5 wt.% alumina hydrate, the remainder water.

12. A coating composition suitable for application to refractory linings and other types of surfaces exposed to high temperatures to provide the linings and surfaces with increased resistance to thermal degradation, the composition comprising zirconium silicate in the range of about 40 to 95 wt.%, sodium silicate in the range of about 0.1 to 30 wt.%, kaolinite in the range of about 1 to 10 wt.%, magnesium silicate up to 5 wt.%, alumina hydrate in the range of about 1 to 10 wt.%, the remainder water, the coating composition capable of withstanding temperatures up to 4,000° F.

* * * * *